(12) United States Patent
Sanada (10) Patent No.: US 7,591,148 B2
(45) Date of Patent: Sep. 22, 2009

(54) VEHICULAR HEAT EXCHANGER MODULE

(75) Inventor: Ryouichi Sanada, Obu (JP)

(73) Assignee: Denso Corporation, Kariya (JP)

( * ) Notice: Subject to any disclaimer, the term of this patent is extended or adjusted under 35 U.S.C. 154(b) by 456 days.

(21) Appl. No.: 10/936,000

(22) Filed: Sep. 8, 2004

(65) Prior Publication Data

US 2005/0056049 A1    Mar. 17, 2005

(30) Foreign Application Priority Data

Sep. 16, 2003  (JP) .............................. 2003-322973

(51) Int. Cl.
*F25B 39/04* (2006.01)
(52) U.S. Cl. ............................. 62/507; 62/509; 165/140
(58) Field of Classification Search .................. 62/507, 62/509; 165/110, 140
See application file for complete search history.

(56) References Cited

U.S. PATENT DOCUMENTS

| | | | |
|---|---|---|---|
| 6,173,766 B1 | 1/2001 | Nakamura et al. | |
| 6,394,176 B1 | 5/2002 | Marsais | |
| 6,640,585 B2 | 11/2003 | Oh et al. | |
| 2002/0073730 A1* | 6/2002 | Shibata et al. ................. | 62/509 |

FOREIGN PATENT DOCUMENTS

| | | |
|---|---|---|
| JP | U-2-45360 | 3/1990 |
| JP | 07-180930 | 7/1995 |
| JP | 2001-059420 | 3/2001 |
| JP | 2001-174168 | 6/2001 |
| JP | A-2001-263869 | 9/2001 |

OTHER PUBLICATIONS

Examination Report in the Corresponding CN application No. 2004100560546 issued Aug. 4, 2006.
Office Action dated Sep. 21, 2007 in corresponding Japanese Application No. 2003- 322973.
Preliminary Rejection dated Apr. 03, 2008 in Korean Application No. 10-2007-0085621 with English translation.
Office action dated May 28, 2009 in corresponding U.S. Appl. No. 2005/0056049.
Office action dated Jan. 23, 2009 in Chinese Application No. 2007 10004798.7.

* cited by examiner

*Primary Examiner*—William E Tapolcai
(74) *Attorney, Agent, or Firm*—Harness, Dickey & Pierce, PLC (57) ABSTRACT

A heat exchanger module includes a condenser for condensing a refrigerant, a modulator, a sub-cooler for cooling liquid refrigerant supplied from the modulator, and a heat exchanger for cooling a fluid different from the refrigerant. The condenser, the sub-cooler and the heat exchanger are arranged in an arrangement direction substantially perpendicular to an air flow direction. Further, the modulator is disposed to extend in the arrangement direction. In the heat exchanger module, the modulator has a dimension that is larger than the sum of a dimension of the condenser and a dimension of the sub-cooler, and is not larger than the sum of the dimension of the condenser, the dimension of the sub-cooler and a dimension of the heat exchanger, in the arrangement direction. Accordingly, a capacity of the modulator can be effectively increased without increasing a largest outer side of the heat exchanger module.

27 Claims, 5 Drawing Sheets

VEHICULAR HEAT EXCHANGER MODULE

CROSS REFERENCE TO RELATED APPLICATION

This application is based on Japanese Patent Application No. 2003-322973 filed on Sep. 16, 2003, the disclosure of which is incorporated herein by reference.

FIELD OF THE INVENTION

The present invention relates to a heat exchanger module constructed with a cooling heat exchanger in which refrigerant of a vapor compression refrigerant cycle flows such as a condenser and a sub-cooler, and a cooling heat exchanger such as an oil cooler in which a fluid different from the refrigerant flows. The heat exchanger module is suitably used for a cooling device of a vehicle.

BACKGROUND OF THE INVENTION

When plural heat exchangers are arranged in a serious in an air flow direction, a dimension of a heat exchanger module composed of the plural heat exchangers in the air flow direction becomes larger. Thus, in a conventional heat exchanger module (e.g., JP-A-2001-174168, U.S. Pat. No. 6,394,176), plural heat exchangers are arranged in a direction perpendicular to an air flow direction, so that the dimension of the heat exchanger module in the air flow direction is reduced. Accordingly, when the heat exchanger module is mounted at a front portion in a vehicle, the dimension of the heat exchanger module in a vehicle front-rear direction can be made smaller.

However, when high-pressure side equipments of the vapor compression refrigerant cycle and a cooling heat exchanger on a vehicle side are simply combined, the function of the components cannot be sufficiently obtained. Generally, the high-pressure side equipments of the vapor-compression refrigerant cycle include a condenser, a gas-liquid separator (modulator) and a sub-cooler. In contrast, the cooling heat exchanger on the vehicle side includes an oil cooler for cooling an engine oil and an automatic transmission fluid (ATF).

For example, when the oil cooler, the condenser, the sub-cooler and the modulator are integrated as an integrated module, it is difficult to sufficiently increase a capacity of the modulator while the maximum outer dimension of the heat exchanger module is restricted.

SUMMARY OF THE INVENTION

In view of the above-described problems, it is an object of the present invention to provide a heat exchange module including a modulator (gas-liquid separator), in which a capacity of the modulator can be increased without enlarging the maximum outer dimension of the heat exchanger module.

According to the present invention, a heat exchanger module includes a condenser for cooling and condensing a refrigerant, a modulator which separates the refrigerant from the condenser into gas refrigerant and liquid refrigerant, a sub-cooler for cooling the liquid refrigerant supplied from the modulator, and a heat exchanger for cooling a fluid different from the refrigerant. In the heat exchanger module, the condenser, the sub-cooler and the heat exchanger are arranged in an arrangement direction that is substantially perpendicular to a flow direction of air passing through the condenser, the sub-cooler and the heat exchanger, and the modulator is disposed to extend in the arrangement direction. Further, the modulator has a dimension in the arrangement direction, that is larger than the sum of a dimension of the condenser and a dimension of the sub-cooler in the arrangement direction, and is equal to or smaller than the sum of the dimension of the condenser, the dimension of the sub-cooler and a dimension of the heat exchanger in the arrangement direction. Accordingly, the capacity of the modulator (gas-liquid separator) can be effectively increased while it can prevent the maximum outer dimension of the heat exchanger module from being increased.

When the condenser, the sub-cooler and the heat exchanger are arranged in a vertical direction, the modulator extends in the vertical direction, and the gas-liquid separation performance of the modulator can be improved. For example, the heat exchanger, the condenser and the sub-cooler are arranged in this order from an upper side in the vertical direction, a bottom end of the modulator is placed at the same position as that of the sub-cooler, and a top end of the modulator is placed at a position corresponding to the heat exchanger in the arrangement direction.

Preferably, a connection pipe is connected to a fluid inlet or a fluid outlet of the heat exchanger to extend in a direction approximately parallel to the flow direction of air. In this case, it can prevent the modulator and the connection pipe from being interfered. Therefore, the capacity of the modulator can be more effectively increased. Alternatively, a first connection pipe connected to the fluid inlet of the heat exchanger and a second connection pipe connected to the fluid outlet of the heat exchanger are provided at a side of the heat exchanger opposite to the modulator with respect to the heat exchanger. In this case, the capacity of the modulator can be readily increased. For example, the heat exchanger is an oil cooler for cooling an oil.

Preferably, the condenser, the sub-cooler and the heat exchanger are integrated by using a header tank extending in the arrangement direction, and the header tank is separated into three space parts communicating with the condenser, the sub-cooler and the heat exchanger, respectively. In this case, the modulator is integrated with the header tank to extend in the arrangement direction, and the dimension of the modulator in the arrangement direction is equal to smaller than a dimension of the header tank in the arrangement direction.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

Figure 1:
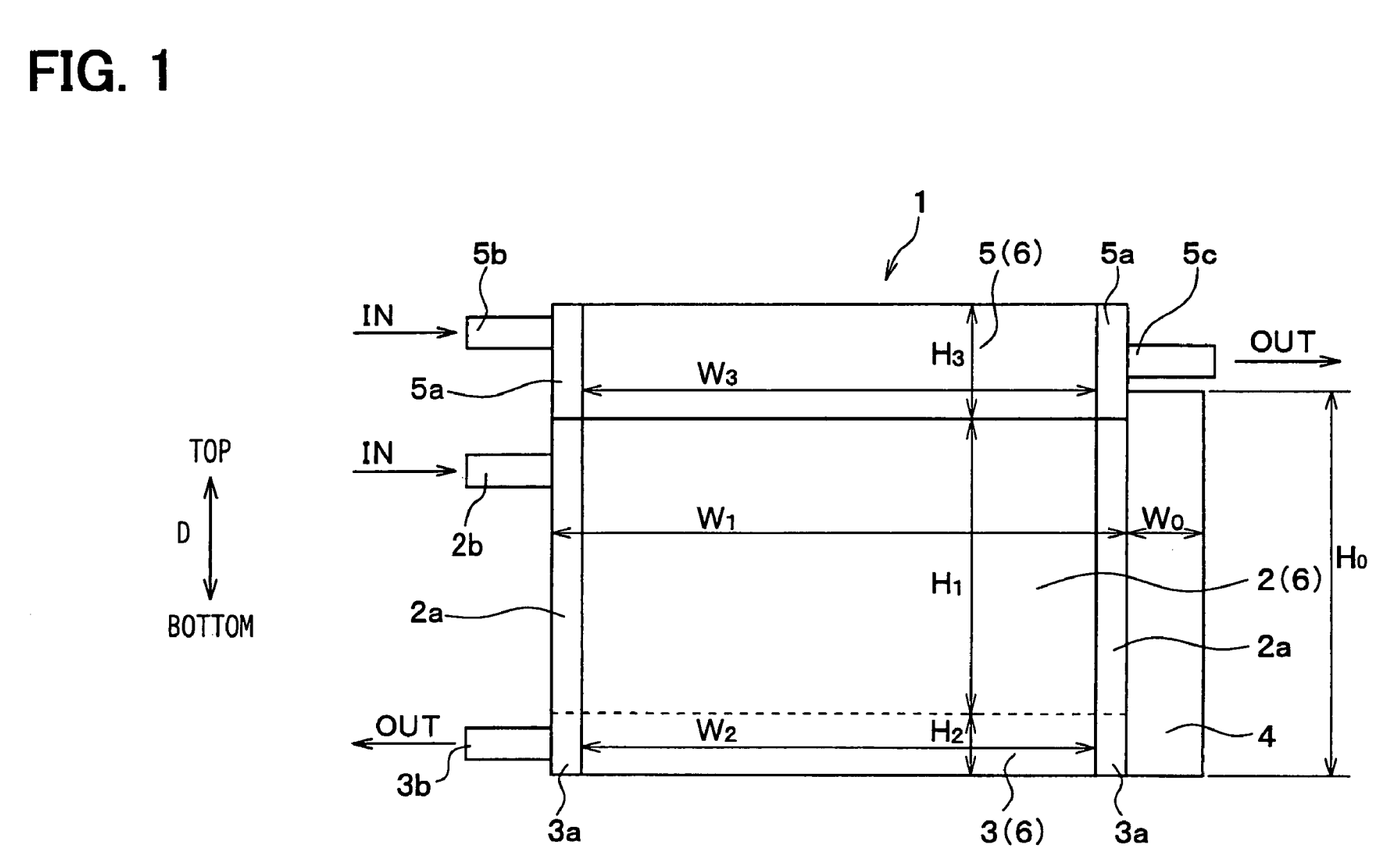
FIG. 1 is a front view showing a cooling heat exchanger module according to a first embodiment of the present invention.

In the first embodiment, a cooling heat exchanger module 1 of the present invention is typically used for a cooling device of a vehicle. FIG. 1 is a front view of the cooling heat exchanger module 1 when being viewed from a downstream air side of the cooling heat exchanger module 1.

As shown in FIG. 1, the heat exchanger module 1 in this embodiment includes: a condenser 2 (refrigerant radiator), a sub-cooler 3 and a modulator 4 (gas-liquid separator) of a vapor compression refrigerant cycle for a vehicle air conditioner; and an oil cooler 5 for cooling an engine oil or an automatic transmission fluid (ATF) of the vehicle.

The condenser 2 is a high-pressure heat exchanger for cooling and condensing high-temperature and high-pressure refrigerant discharged from a compressor of the vapor-compression refrigerant cycle. The sub-cooler 3 is a super-cooling device for further cooling the liquid refrigerant condensed in the condenser 2 so as to increase a super-cooling degree of the refrigerant. The modulator 4 is a gas-liquid separator, which separates refrigerant flowing from the condenser 2 into gas refrigerant and liquid refrigerant, and supplies the separated liquid refrigerant to the sub-cooler 3. For example, the modulator 4 is a cylindrical receiver in which liquid refrigerant is stored as a surplus refrigerant of the vapor compression refrigerant cycle.

Generally, the vapor compression refrigerant cycle includes the compressor for compressing refrigerant, the condenser 2, the modulator 4, the sub-cooler 3, a decompression device for decompressing high-pressure liquid refrigerant flowing out of the sub-cooler 3, and an evaporator in which low-pressure refrigerant decompressed in the decompression device is evaporated by absorbing heat.

The condenser 2 includes multiple tubes (not shown) in which refrigerant flows, and two header tanks 2a disposed at longitudinal two end sides of each tube to communicate with the tubes. Similarly, the sub-cooler 3 includes multiple tubes (not shown) in which liquid refrigerant from the modulator 4 flows, and two header tanks 3a disposed at longitudinal two end sides of each tube to communicate with the tubes. In this embodiment, the tubes of the condenser 2 and the sub-cooler 3 are disposed to extend in a horizontal direction, and the header tanks 2a, 3a of the condenser 2 and the sub-cooler 3 are disposed to extend in a vertical direction. Similarly to the condenser 2 and the sub-cooler 3, the oil cooler 5 includes multiple tubes (not shown) in which oil flows, and two header tanks 5a disposed at longitudinal two end sides of each tube to communicate with the tubes. The tubes of the oil cooler 5 extend in the horizontal direction and the header tanks 5a extend in the vertical direction.

Further, the header tank 5a of the oil cooler 5, the header tank 2a of the condenser 2 and the header tank 3a of the sub-cooler 3 extend continuously from a top side to a bottom side. For example, the header tank 5a, the header tank 2a and the header tank 3a are formed into a cylindrical tank having two separation plates for separating an inner space of the cylindrical tank into three space parts. Further, a heat exchanging core portion 6 of the condenser 2, the sub-cooler 3 and the oil cooler 5 is formed between the two cylindrical tanks of the condenser 2, the sub-cooler 3 and the oil cooler 5. As shown in FIG. 1, the condenser 2, the sub-cooler 3 and the oil cooler 5 are arranged in an arrangement direction D (e.g., vertical direction) that is substantially perpendicular to an air flow direction passing through the heat exchanging core portion 6.

In this embodiment, the oil cooler 5, the condenser 2 and the sub-cooler 3 are integrated by two cylindrical tanks each of which continuously extends from a top end side of the oil cooler 5 to a bottom end side of the sub-cooler 3. The tubes, the header tanks 2a, 3a, 5a and the separation plates of the condenser 2, the sub-cooler 3 and the oil cooler 5 are integrally bonded by a brazing or soldering.

Here, the brazing or soldering is a bonding technology where a basic material is not melted by using a brazing metal or a solder as described in, for example, Connection and Bonding Technology (Tokyo Electrical Machinery University Publishing Company). Generally, the brazing is referred when the joining is performed by using a metal material with a melting point beyond 450° C., and this metal material is called as the brazing material. Then, the soldering is referred when the joining is performed by using a metal material with a melting point below 450° C., and this metal material is called as the solder.

Furthermore, the modulator 4 is constructed with a cylindrical tank extending in the arrangement direction D (vertical direction) and cover members for closing top and bottom ends of the cylindrical tank portion. A liquid refrigerant outlet through which the separated liquid refrigerant is supplied to the sub-cooler 3 is provided at a bottom end side of the cylindrical tank portion of the modulator 4. Further, a refrigerant inlet, through which refrigerant flowing out of the condenser 2 is introduced into the modulator 4, is provided in the modulator 4 at an upper side of the liquid refrigerant outlet.

In the first embodiment, as shown in FIG. 1, the tank portion of the modulator 4 is brazed to the header tanks 2a and 3a of the condenser 2 and the sub-cooler 3 while contacting the header tanks 2a and 3a. However, the modulator 4 can be integrated to the header tanks 2a, 3a of the condenser 2 and the sub-cooler 3 while an insulation space is provided between the header tanks 2a, 3a and the modulator 4.

The modulator 4 has a bottom end that is positioned at the same height position of a bottom end of the sub-cooler 3 or at a position higher than the bottom end of the sub-cooler 3. That is, the bottom end of the modulator 4 is placed at a position equal to or higher than a bottom end of the heat exchanging core portion 6. In contrast, a top end of the modulator 4 is placed at a position corresponding to the oil cooler 5 in the arrangement direction D (vertical direction).

Therefore, a height dimension Ho (longitudinal dimension) of the modulator 4 is set larger than a total of a dimension of the condenser 2 and a dimension of the sub-cooler 3 in the arrangement direction D, and is smaller than a total of the dimension of the condenser 2, the dimension of the sub-cooler 3 and a dimension of the oil cooler 5 in the arrangement direction D. That is, the height dimension Ho of the modulator 4 is longer than the sum of a height dimension H1 of the condenser 2 and a height dimension H2 of the sub-cooler 3, and is shorter than a total of the height dimension H1 of the condenser 2, the height dimension H2 of the sub-cooler 3 and a height dimension H3 of the oil cooler 5.

Therefore, the height dimension H1 of the condenser 2, the height dimension H2 of the sub-cooler 3, the height dimension H3 of the oil cooler 5 and the height dimension Ho of the modulator 4 has a relationship of $H1+H2<Ho<H1+H2+H3$.

An oil connection pipe 5b is connected to an oil inlet of the oil cooler 5, and an oil connection pipe 5c is connected to an oil outlet of the oil cooler 5. In this embodiment, the oil flowing into the oil inlet passes through the tubes of the oil cooler 5 from the left side to the right side in FIG. 1, and is discharged through the oil outlet.

A refrigerant connection pipe 2b is connected to a refrigerant inlet of the condenser 2, and a refrigerant connection pipe 3b is connected to a refrigerant outlet of the sub-cooler 3. The refrigerant discharged from the compressor is introduced into the refrigerant connection pipe 2b, and flows through the condenser 2, the modulator 4 and the sub-cooler 3, in this order. Then, the refrigerant from the sub-cooler 3 flows into the decompression device through the refrigerant connection pipe 3b.

Figure 2:
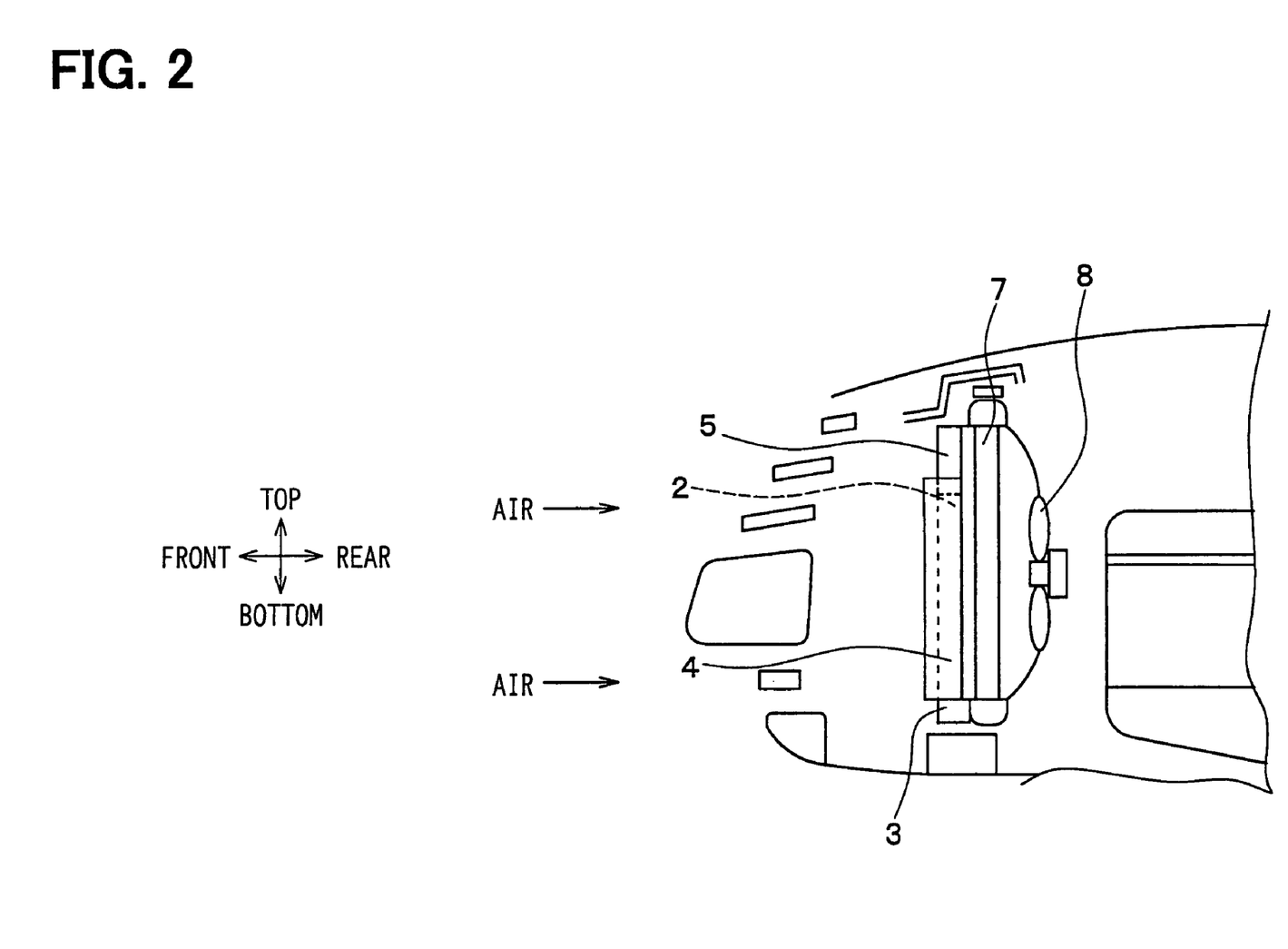
FIG. 2 is a schematic view showing a mounting state of the cooling heat exchanger module in a vehicle, according to the first embodiment.

As shown in FIG. 2, a radiator 7, for cooling engine-cooling water by performing heat exchange between the engine-cooling water and air, is disposed at a downstream air side of the cooling heat exchanger module 1. Further, a blower 8 is disposed to blow air (cooling air) to the cooling heat exchanger module 1 and the radiator 7.

According to the first embodiment of the present invention, the height dimension Ho of the modulator 4 is longer than the total of the height dimension H1 of the condenser 2 and the height dimension H2 of the sib-cooler 3, and is shorter than the total of the height dimension H1 of the condenser 2, the height dimension H2 of the sub-cooler 3 and the height dimension H3 of the oil cooler 5. Further, the modulator 4 extends to a position corresponding to a top end side of the oil cooler 5. Thus, the capacity of the modulator 4 can be effectively increased without increasing a horizontal dimension of the modulator 4.

A necessary space for mounting the cooling heat exchanger module 1 is a space with six sides, determined by the largest dimension of the cooling heat exchanger module 1. For example, the largest height dimension of the cooling heat exchanger module 1 is the sum of the height dimension H1 of the condenser 2, the height dimension H2 of the sub-cooler 3 and the height dimension H3 of the oil cooler 5. The largest width dimension of the cooling heat exchanger module 1 is the sum of a width dimension W1 of the condenser 2 and the width dimension Wo of the modulator 4. In this embodiment, the width dimension W1 of the condenser 2, a width dimension W2 of the sub-cooler 3 and a width dimension W3 of the oil cooler 5 are set the same.

When the capacity of the modulator 4 is increased by enlarging the width dimension Wo of the modulator 4, the largest width dimension of the cooling heat exchanger module 1 is increased, and thereby, the largest outer size of the cooling heat exchanger module 1 becomes larger. However, in the first embodiment, the height dimension Ho of the modulator 4 is enlarged so that the capacity of the modulator 4 is increased, while the top and bottom ends of the modulator 4 are placed at positions corresponding to the oil cooler 5 in the vertical direction. Accordingly, the capacity of the modulator 5 can be enlarged while it can prevent the largest outer size of the cooling heat exchanger module 1 from being increased.

Figure 5:
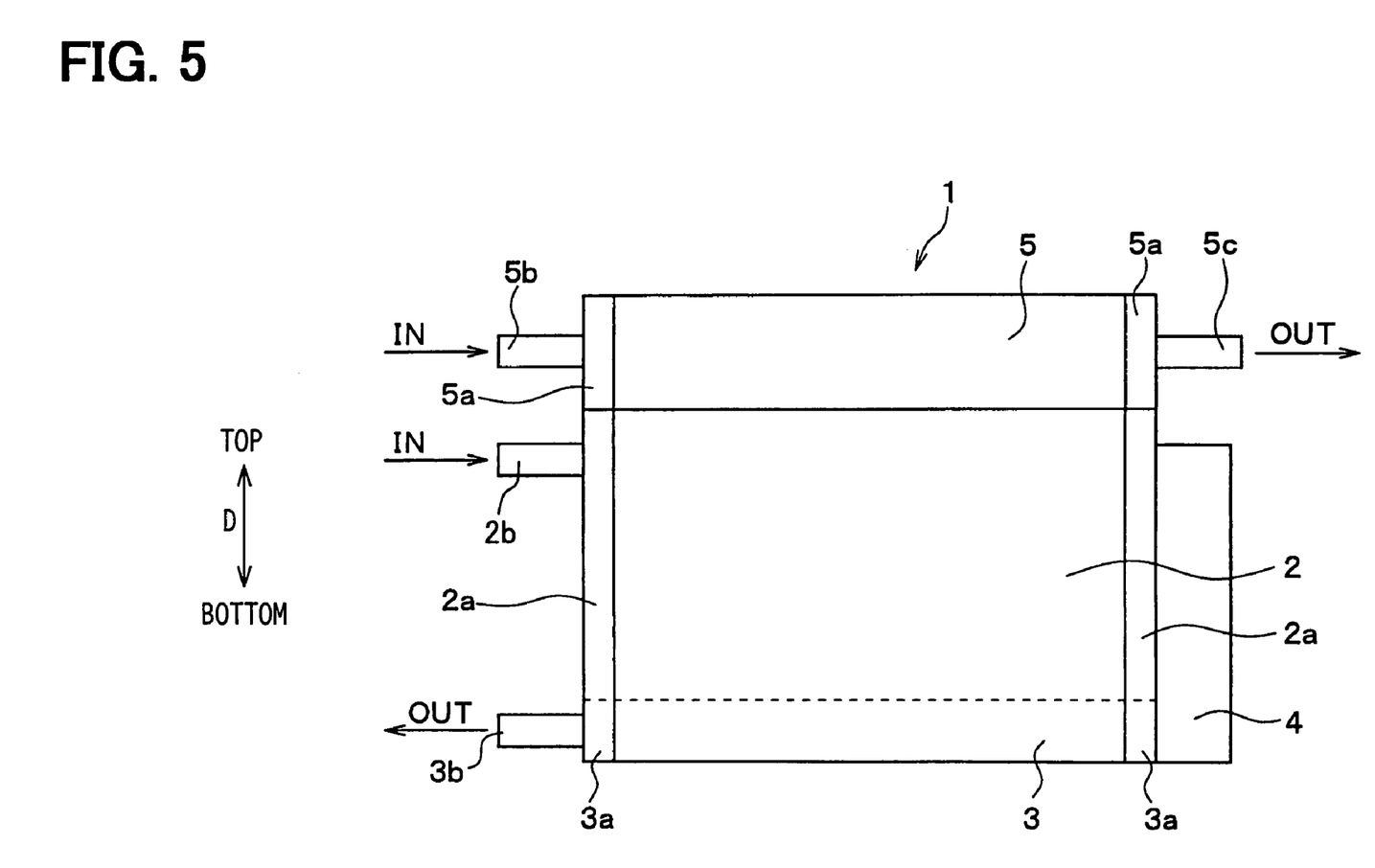
FIG. 5 is a front view showing a cooling heat exchanger module of a comparison example.

FIG. 5 shows a comparison example performed by the inventors of the present application, in which the height dimension Ho of the modulator 4 is smaller than the sum of the height dimension H1 of the condenser 2 and the height dimension H2 of the sub-cooler 3. In this case, it is difficult to effectively increase the capacity of the modulator 4 while restricting the width dimension of the modulator 4.

Second Embodiment

The second embodiment of the present invention will be now described with reference to FIG. 3. In the above-described first embodiment, the connection pipe 5c is connected to a side surface of the oil cooler 5, where the modulator 4 extends. In this case, because it is necessary to prevent an interference between the connection pipe 5c and the modulator 4, the height dimension Ho of the modulator 4 cannot be enlarged to a dimension equal to the sum of the height dimension H1 of the condenser 2, the height dimension H2 of the sun-cooler 3 and the height dimension H3 of the oil cooler 5.

Figure 3:
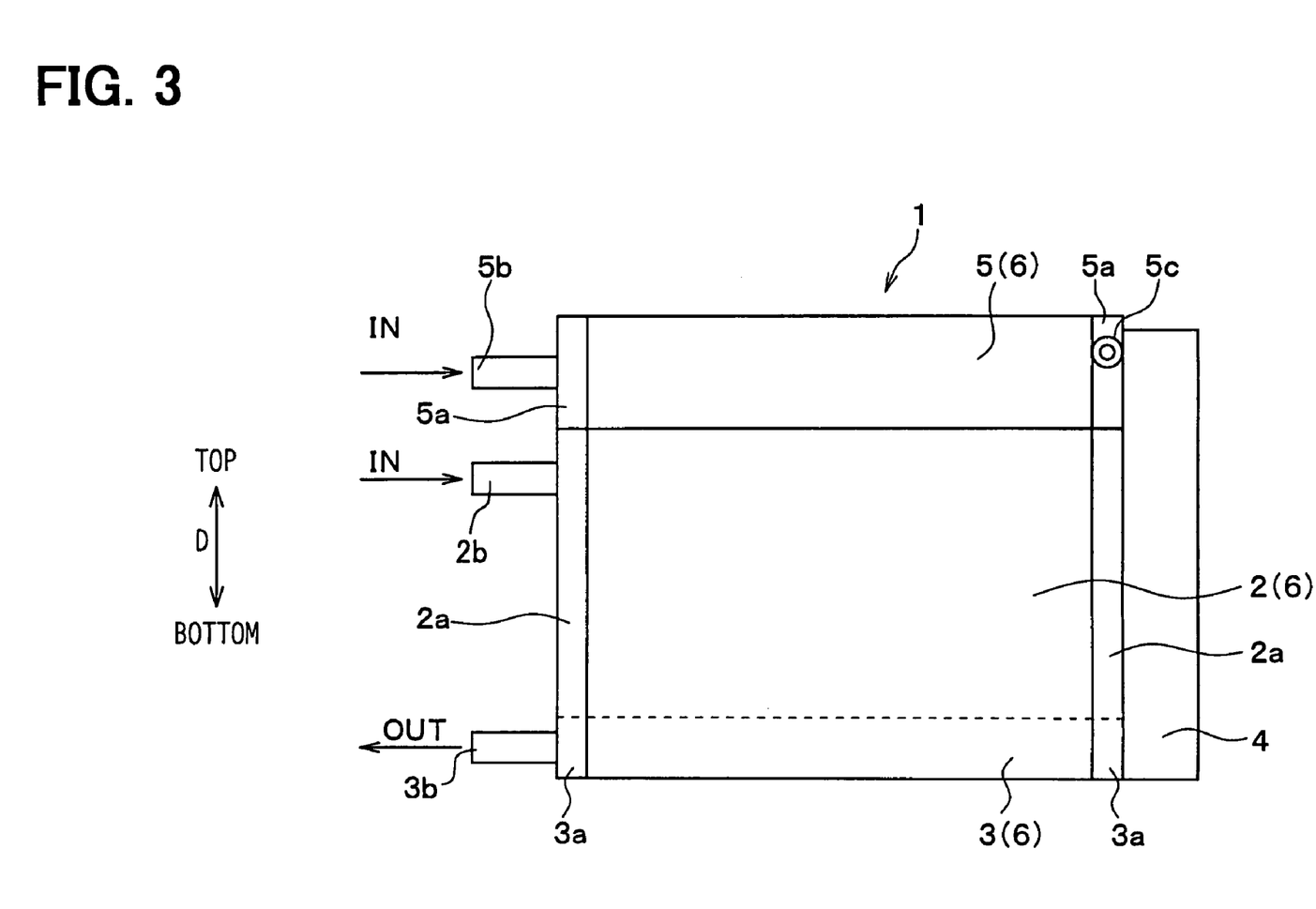
FIG. 3 is a front view showing a cooling heat exchanger module according to a second embodiment of the present invention.

In the second embodiment, as shown in FIG. 3, the connection pipe 5c is connected to the oil outlet of the oil cooler 5 to extend in a direction parallel to the air flow direction. In this case, it can prevent the modulator 4 from being interfered with the connection pipes 5c. Accordingly, in the second embodiment, it is possible to increase the height dimension Ho of the modulator 4 to the dimension equal to the sum of the height dimension H1 of the condenser 2, the height dimension H2 of the sun-cooler 3 and the height dimension H3 of the oil cooler 5. As a result, the capacity of the modulator 4 can be more effectively enlarged while it can prevent the largest outer dimension of the cooling heat exchanger module 1 from being increased.

Third Embodiment

Figure 4:
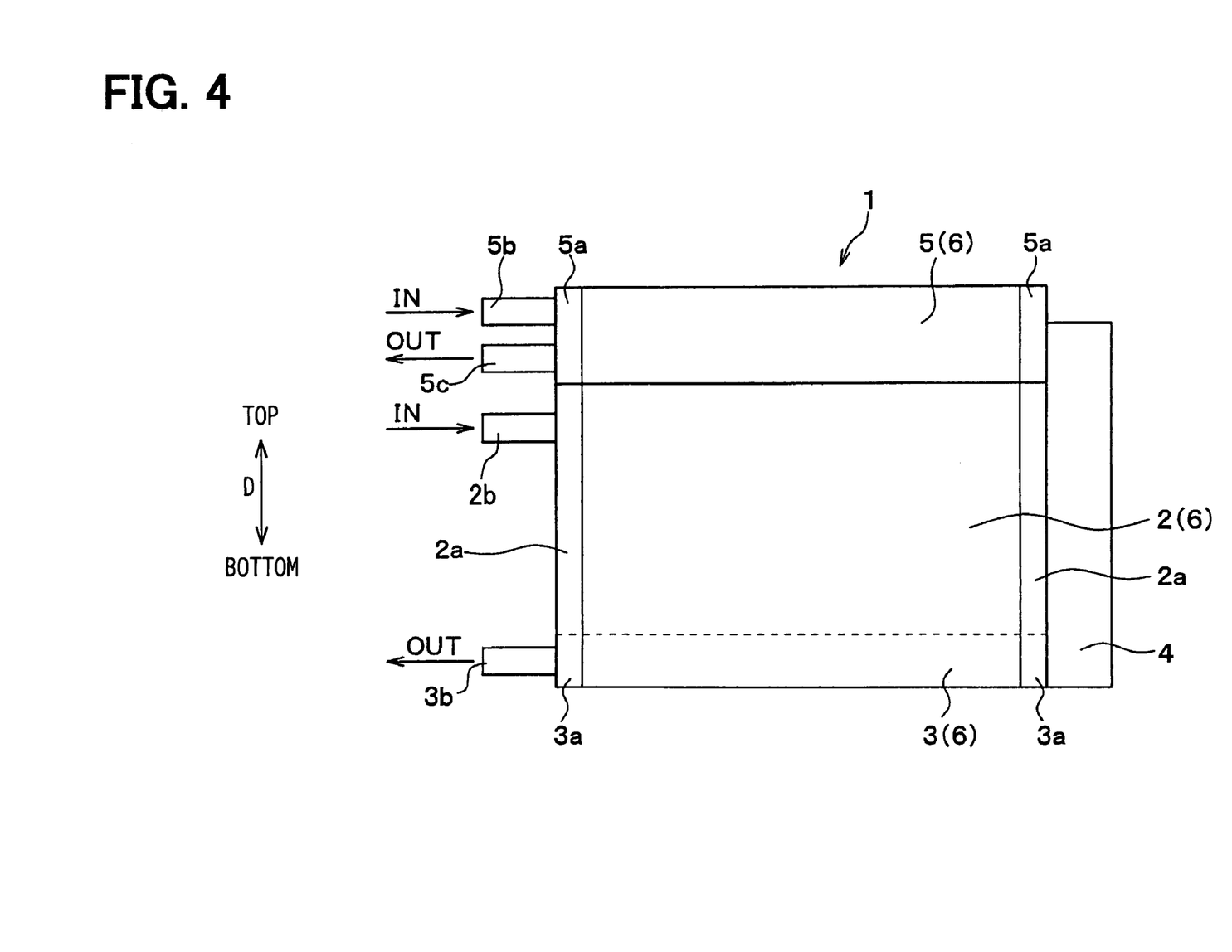
FIG. 4 is a front view showing a cooling heat exchanger module according to a third embodiment of the present invention.

In the above-described second embodiment, the connection pipe 5c connected to the oil outlet of the oil cooler 5 is provided to protrude in the direction parallel to the air flow direction. However, in the third embodiment, as shown in FIG. 4, both the connection pipe 5b connected to the oil inlet of the oil cooler 5 and the connection pipe 5c connected to the oil outlet of the oil cooler 5 are provided at a side of the header tank 5a, opposite to the modulator 4 with respect to the oil cooler 5. That is, both the connection pipes 5b and 5c are connected to the left header tank 5a in FIG. 4, and the modulator 4 is provided adjacent to the right header tank 5a in FIG. 4. Accordingly, it can prevent the modulator 5 and the connection pipe 5c from being interfered with each other.

Thus, in the third embodiment, it is possible to increase the height dimension Ho of the modulator 4 to the dimension equal to the sum of the height dimension H1 of the condenser 2, the height dimension H2 of the sub-cooler 3 and the height dimension H3 of the oil cooler 5. As a result, the capacity of the modulator 4 can be effectively enlarged while it can prevent the largest outer dimension of the cooling heat exchanger module 1 from being increased.

In the third embodiment, because both the connection pipes 5b and 5c are connected to the oil cooler 5 at the side opposite to the modulator 4, the connection pipes 5b and 5c can be provided to protrude in a direction perpendicular to the air flow direction or in a direction parallel to the air flow direction.

Other Embodiment

Although the present invention has been fully described in connection with the preferred embodiments thereof with reference to the accompanying drawings, it is to be noted that various changes and modifications will become apparent to those skilled in the art.

For example, in the above-described embodiments, the oil cooler 5, the condenser 2 and the sub-cooler 3 are arranged in this order from an upper side in the vertical direction. However, the arrangement order in the vertical direction can be changed. For example, the condenser 2, the oil cooler 5 and the sub-cooler 3 can be arranged in this order from the upper side in the vertical direction.

In the above-described embodiments, the header tank 5a, the header tank 2a and the header tank 3a can be separated from each other by using two pair of separators having an insulation space between each pair of the separators. Further, an unused tube in which no fluid flows can be placed between the core portions 6 of the oil cooler and the condenser 2, for example, to insulate the different kinds of heat exchangers.

In the above-described embodiments, the condenser 2, the sub-cooler 3, the modulator 4 and the oil cooler 5 are integrated. However, instead of the oil cooler 5, other heat exchanger such as an inter cooler for cooling an intake air pressed by a super charger can be used. In this case, the heat exchanger other than the oil cooler 5, the condenser 2, the sub-cooler 3 and the modulator 4 are integrated.

In the above-described embodiments, the condenser 2, the sub-cooler 3 and the oil cooler 5 are integrated. However, the present invention is not limited to an integrated structure. For example, the condenser 2, the sub-cooler 3 and the oil cooler 5 can be arranged in an arrangement direction perpendicular to the air flow direction, and can be mounted on a vehicle in this arrangement state.

Such changes and modifications are to be understood as being within the scope of the present invention as defined by the appended claims.

What is claimed is:

1. A heat exchanger module comprising:
    a condenser for cooling and condensing a refrigerant;
    a modulator which separates the refrigerant from the condenser into gas refrigerant and liquid refrigerant;
    a sub-cooler for cooling the liquid refrigerant supplied from the modulator; and
    a heat exchanger for cooling a fluid different from the refrigerant, wherein:
    the condenser, the sub-cooler and the heat exchanger are stacked immediately adjacent one another in a stacked direction that is substantially perpendicular to a flow direction of air passing through the condenser;
    the modulator has a dimension in the stacked direction, that is larger than the sum of a dimension of the condenser and a dimension of the sub-cooler in the stacked direction, and is equal to or smaller than the sum of the dimension of the condenser, the dimension of the sub-cooler and a dimension of the heat exchanger in the stacked direction;
    the heat exchanger includes a core portion in which the fluid is heat exchanged with air passing therethrough, a first heat exchanger header tank located at one side of the core portion, and a second heat exchanger header tank located at an opposite side of the core portion;
    the modulator is connected to the second heat exchanger header tank; and
    an inlet pipe is connected to the first heat exchanger header tank.

2. The heat exchanger module according to claim 1, wherein the condenser, the sub-cooler and the heat exchanger are stacked immediately adjacent one another in a vertical direction.

3. The heat exchanger module according to claim 1, wherein:
    the heat exchanger, the condenser and the sub-cooler are stacked immediately adjacent one another in this order from an upper side in a vertical direction; and
    a bottom end of the modulator is placed at the same position as that of the sub-cooler, and a top end of the modulator is placed at a position corresponding to the heat exchanger in the stacked direction.

4. The heat exchanger module according to claim 1, further comprising
    a connection pipe that is connected to a fluid outlet of the heat exchanger to extend in a direction approximately parallel to the flow direction of air through the condenser.

5. The heat exchanger module according to claim 1, further comprising:
    a connection pipe connected to a fluid outlet of the heat exchanger,
    wherein both the inlet pipe and the connection pipe are provided at a side of the heat exchanger opposite to the modulator with respect to the heat exchanger.

6. The heat exchanger module according to claim 1, wherein at least the condenser, the sub-cooler and the heat exchanger are integrated.

7. The heat exchanger module according to claim 1, wherein the heat exchanger is an oil cooler for cooling oil.

8. The heat exchanger according to claim 1, wherein:
    the condenser, the sub-cooler and the heat exchanger are integrated by using a common header tank extending in the stacked direction;
    the common header tank is separated into three space parts communicating with the condenser, the sub-cooler and the heat exchanger, respectively;
    the modulator is integrated with the common header tank to extend in the stacked direction; and
    the dimension of the modulator in the stacked direction is equal to smaller than a dimension of the common header tank in the stacked direction.

9. A heat exchanger module comprising:
    a condenser for cooling and condensing a refrigerant;
    a modulator which separates the refrigerant from the condenser into gas refrigerant and liquid refrigerant;
    a sub-cooler for cooling the liquid refrigerant supplied from the modulator; and
    a heat exchanger for cooling a fluid different from the refrigerant, wherein:
    the heat exchanger, the condenser and the sub-cooler are stacked immediately adjacent one another in this order from an upper side in a vertical direction;
    a bottom end of the modulator is placed at the same position as a bottom end of the sub-cooler, and a top end of the modulator is placed at a position corresponding to the heat exchanger in the vertical direction;
    the heat exchanger includes a core portion in which the fluid is heat exchanged with air passing therethrough, a first heat exchanger header tank located at one side of the core portion, and a second heat exchanger header tank located at an opposite side of the core portion;
    the modulator is connected to the second heat exchanger header tank; and
    an inlet pipe is connected to the first heat exchanger header tank.

10. The heat exchanger module according to claim 1, the module further comprising:
    a fluid-outlet side connection pipe connected to the second heat exchanger header tank at a position above a top end of the modulator.

11. The heat exchanger module according to claim 1, where the condenser, the sub-cooler and the heat exchanger are arranged on a plane generally perpendicular to the flow direction of air passing through the condenser.

12. The heat exchanger module according to claim 1, wherein the condenser is located between the sub-cooler and the heat exchanger in the stacked direction.

13. The heat exchanger module according to claim 1, wherein:

the condenser, the modulator and the sub-cooler are parts of a refrigerant cycle in which the refrigerant circulates; and the heat exchanger is a member separated from the refrigerant cycle.

14. The heat exchanger module according to claim 1, wherein the refrigerant flows inside the condenser and the fluid different from the refrigerant flows inside the heat exchanger.

15. The heat exchanger module according to claim 9, wherein the heat exchanger is an oil cooler for cooling oil flowing therein.

16. The heat exchanger module according to claim 9, wherein the refrigerant flows inside the condenser and the fluid different from the refrigerant flows inside the heat exchanger.

17. The heat exchanger module according to claim 9, where the condenser, the sub-cooler and the heat exchanger are arranged on a plane generally perpendicular to the flow direction of air through the condenser.

18. The heat exchanger module according to claim 9, wherein the condenser is located between the sub-cooler and the heat exchanger in the stacked direction.

19. The heat exchanger module according to claim 1, wherein the condenser and the sub-cooler have a condenser header tank extending in an extension line, the second heat exchanger header tank extends on the extending line of the condenser header tank and the modulator is connected to the condenser header tank and the heat exchanger second header tank.

20. The heat exchanger module according to claim 9, wherein the condenser and the sub-cooler have a condenser header tank extending in an extension line, the second heat exchanger header tank extends on the extending line of the condenser header tank and the modulator is connected to the condenser header tank and the heat exchanger second header tank.

21. The heat exchanger module according to claim 9, the module further comprising:

a fluid-outlet side connection pipe connected to the second heat exchanger header tank at a position above a top end of the modulator.

22. The heat exchanger module according to claim 9, further comprising a connection pipe that is connected to a fluid outlet of the heat exchanger to extend in a direction approximately parallel to the flow direction of air.

23. The heat exchanger module according to claim 22, wherein the connection pipe is connected to the second heat exchanger header tank.

24. The heat exchanger module according to claim 4, wherein the connection pipe is connected to the second heat exchanger header tank.

25. The heat exchanger module according to claim 9, further comprising:

a connection pipe connected to a fluid outlet of the heat exchanger, wherein both the inlet pipe and the connection pipe are provided at a side of the heat exchanger opposite to the modulator with respect to the heat exchanger.

26. The heat exchanger module according to claim 1, wherein the sub-cooler directly engages one of the condenser and the heat exchanger in the stacked direction and the heat exchanger directly engages one of the condenser and the sub-cooler in the stacked direction.

27. The heat exchanger module according to claim 9, wherein the sub-cooler directly engages one of the condenser and the heat exchanger in the stacked direction and the heat exchanger directly engages one of the condenser and the sub-cooler in the stacked direction.

* * * * *

UNITED STATES PATENT AND TRADEMARK OFFICE
CERTIFICATE OF CORRECTION

| | | |
|---|---|---|
| PATENT NO. | : 7,591,148 B2 | Page 1 of 1 |
| APPLICATION NO. | : 10/936000 | |
| DATED | : September 22, 2009 | |
| INVENTOR(S) | : Ryouichi Sanada | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 625 days.

Signed and Sealed this

Twenty-first Day of September, 2010

David J. Kappos
*Director of the United States Patent and Trademark Office*